US010459950B2

(12) United States Patent
Pasternack et al.

(10) Patent No.: US 10,459,950 B2
(45) Date of Patent: Oct. 29, 2019

(54) AGGREGATED BROAD TOPICS

(71) Applicant: Facebook, Inc., Menlo Park, CA (US)

(72) Inventors: Jeffrey William Pasternack, Belmont, CA (US); Giridhar Rajaram, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 600 days.

(21) Appl. No.: 14/981,626

(22) Filed: Dec. 28, 2015

(65) Prior Publication Data
US 2017/0185666 A1    Jun. 29, 2017

(51) Int. Cl.
| | | |
|---|---|---|
| G06F 16/00 | (2019.01) | |
| G06F 16/28 | (2019.01) | |
| G06F 16/951 | (2019.01) | |
| G06F 16/22 | (2019.01) | |
| G06Q 30/02 | (2012.01) | |
| G06Q 50/00 | (2012.01) | |

(52) U.S. Cl.
CPC ........ G06F 16/285 (2019.01); G06F 16/2228 (2019.01); G06F 16/951 (2019.01); G06Q 30/02 (2013.01); G06Q 50/01 (2013.01)

(58) Field of Classification Search
CPC ............. G06F 17/30; G06F 17/2785; G06F 17/30321; G06F 17/30864; G06F 16/34; G06F 16/9038; G06F 16/2228; G06F 16/285; G06F 16/951; G06F 16/9024; G06F 16/24578; G06F 16/358; G06F 16/24575; G06F 16/367; G06F 16/51; G06F 16/583; G06F 17/21; G10L 15/1815; G06Q 50/01
See application file for complete search history.

(56) References Cited

U.S. PATENT DOCUMENTS

| | | | | |
|---|---|---|---|---|
| 5,446,891 | A * | 8/1995 | Kaplan | G06F 16/94 |
| 8,396,864 | B1 * | 3/2013 | Harinarayan | G06F 16/353 |
| | | | | 707/722 |
| 8,490,136 | B2 * | 7/2013 | Cox | H04N 5/44543 |
| | | | | 725/46 |
| 8,539,359 | B2 * | 9/2013 | Rapaport | G06Q 10/10 |
| | | | | 715/751 |
| 8,676,937 | B2 * | 3/2014 | Rapaport | H04L 51/32 |
| | | | | 709/219 |
| 8,868,406 | B2 * | 10/2014 | Tirumalachetty | G06F 17/2745 |
| | | | | 704/9 |
| 2006/0093222 | A1 * | 5/2006 | Saffer | G06K 9/6218 |
| | | | | 382/224 |

(Continued)

*Primary Examiner* — Merilyn P Nguyen
(74) *Attorney, Agent, or Firm* — Baker Botts L.L.P.

(57) ABSTRACT

In one embodiment, a method includes deriving input topics based on a content item, generating a matrix of scores for the input topics according to a first set of cross-indexed topics, where each of the scores indicates a degree of similarity between a corresponding one of the input topics and a corresponding one of the first cross-indexed topics, calculating a total score for each of the first cross-indexed topics based on the scores for the first cross-indexed topic across all of the input topics, and selecting one or more of the first cross-indexed topics based on the total scores of the first cross-indexed topics. Deriving the input topics may include using a topic tagger to identify the topics based on the content item. The first set of cross-indexed topics may be generated from a database of topics, such as an online encyclopedia.

14 Claims, 9 Drawing Sheets

(56) References Cited

U.S. PATENT DOCUMENTS

| | | | | |
|---|---|---|---|---|
| 2010/0049770 A1* | 2/2010 | Ismalon | ............... | G06Q 30/02 707/765 |
| 2012/0042263 A1* | 2/2012 | Rapaport | ............... | G06Q 30/02 715/753 |
| 2012/0296967 A1* | 11/2012 | Tao | ............... | G06Q 30/0251 709/204 |
| 2013/0018896 A1* | 1/2013 | Fleischman | ............... | G06Q 50/01 707/748 |
| 2013/0086063 A1* | 4/2013 | Chen | ............... | G06Q 30/0251 707/736 |
| 2015/0149461 A1* | 5/2015 | Aguilar Lemarroy | ............... | G06F 17/30705 707/737 |
| 2016/0124965 A1* | 5/2016 | Ding | ............... | G06F 16/24578 707/734 |
| 2016/0147891 A1* | 5/2016 | Chhichhia | ............... | G06F 16/93 707/734 |
| 2017/0039297 A1* | 2/2017 | Koutrika | ............... | G06F 17/21 |

\* cited by examiner

400

| Broad Topics | | Input Topics | | |
|---|---|---|---|---|
| | | New York Yankees | Hot Dogs | Sum of Scores |
| Broad Topics | Baseball | 0.9 | 0.25 | 1.15 |
| | Sports | 0.6 | 0.25 | 0.85 |

| | | Broad Topics (Entities or Categories) | | | | | | | |
|---|---|---|---|---|---|---|---|---|---|
| | | Baseball | Sports | JFK | Football | Ball | Zebra | Competition | President | Animal |
| Input Topics | Baseball | 1.0 | 0.8 | 1.0 | 0.3 | 0.2 | 0.01 | 0 | 0 | 0 |
| | Yankees | 0.9 | 0.6 | 0.01 | 0.1 | 0.1 | 0.005 | 0 | 0 | 0 |
| | Hot Dogs | 0.25 | 0.25 | 0.2 | 0.1 | 0.1 | 0.7 | 0 | 0 | 0 |
| | Sports | 0.005 | 1.0 | 0.2 | 0.8 | 0.7 | 0.01 | 0.7 | 0.1 | 0.3 |
| | JFK | 0.03 | 0.02 | 1.0 | 0.1 | 0.1 | 0.01 | 0.2 | 0.8 | 0.1 |
| | Football | 0.005 | 0.1 | 0.1 | 1.0 | 0.2 | 0.01 | 0 | 0.007 | 0.002 |
| | Ball | 0.02 | 0.7 | 0.1 | 0.02 | 1.0 | 0.01 | 0.2 | 0.01 | 0.1 |
| | Zebra | 0.01 | 0.01 | 0.01 | 0.01 | 0.01 | 1.0 | 0.01 | 0.001 | 0.9 |

| | | Broad Topics | | | | | |
|---|---|---|---|---|---|---|---|
| | | Baseball | Sports | JFK | Football | Ball | Zebra |
| Input Topics | Baseball | 1.0 | 0.8 | 0.1 | 0.3 | 0.2 | 0.01 |
| | Yankees | 0.9 | 0.6 | 0.01 | 0.1 | 0.1 | 0.005 |
| | Hot Dogs | 0.25 | 0.25 | 0.2 | 0.1 | 0.01 | 0.07 |
| | Sum | 2.15 | 1.65 | 0.31 | 0.5 | 0.31 | 0.085 |

| | | Broad Topics | | | | | | | | |
|---|---|---|---|---|---|---|---|---|---|---|
| | | Baseball | Sports | JFK | Football | Ball | Zebra | Competition | President | Animal |
| Input Topics | Baseball | 1.0 | 0.8 | 0.1 | 0.3 | 0.2 | 0.01 | 0 | 0 | 0 |
| | Sports | 0.005 | 1.0 | 0.2 | 0.8 | 0.7 | 0.01 | 0.7 | 0.1 | 0.3 |
| | JFK | 0.03 | 0.02 | 1.0 | 0.1 | 0.1 | 0.01 | 0.2 | 0.8 | 0.1 |
| | Football | 0.005 | 0.1 | 0.1 | 1.0 | 0.2 | 0.01 | 0 | 0.007 | 0.002 |
| | Ball | 0.02 | 0.7 | 0.1 | 0.02 | 1.0 | 0.01 | 0.2 | 0.01 | 0.1 |
| | Zebra | 0.01 | 0.01 | 0.01 | 0.01 | 0.01 | 1.0 | 0.01 | 0.001 | 0.9 |
| | Sum | 1.07 | 2.63 | 1.51 | 2.32 | 2.21 | 1.05 | 0.91 | 0.918 | 1.402 |

*FIG. 7*

AGGREGATED BROAD TOPICS

TECHNICAL FIELD

This disclosure generally relates to identifying topics of content in an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, text content may be classified into broad topics by using a topic tagger to identify a set of input topics based on the text, using a topic-mapping index to map each of the input topics to one or more broad topics, such as categories of the input topic, and associated similarity scores, and calculating sums of the similarity scores. A social-networking system may use the broad topics to generate recommendations, rankings, and other categorizations of the text content. A "broad" topic of text may be a topic that has a broader meaning than at least one of the words in the text, though broad topics are not limited to topics having a particular breadth of meaning. For example, a broad topic of a sentence that contains the words "Babe Ruth" and "New York Yankees" may be "baseball." The text content may be text posted by a user, a comment, a news article, and so on.

In particular embodiments, to identify broad topics, an ordinary topic tagger may first be used to identify input topics in text content. The input topics may include entity names, e.g., names of entities in an online social network, and common names, e.g., proper nouns. A set of broad topics then may be identified based on the input topics using a topic-mapping index. The topic-mapping index may map input topics to broad topics, and may include a pre-calculated similarity score for each (input topic, broad topic) pair that indicates a strength of similarity between the pair of topics. The topic-mapping index may be generated based on a large data set such as the Wikipedia™ online encyclopedia. The identified broad topics may be aggregated by computing the sum of the similarity scores associated with the identified broad topics for each input topic to generate a total score for each identified broad topic. The identified broad topic having the highest total score may be considered the most likely of the identified broad topics to be an overarching or overall topic of the text content. The identified broad topics may be ranked in order of similarity to the text content by sorting them according to their associated total scores. The identified broad topics and their scores may be useful for ranking posts or as input to a meta-classifier that processes the output of other classifiers to perform tasks such as ranking based on a variety of classifiers.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 4 illustrates an example table showing two broad topics with aggregated similarity scores.

FIG. 5 illustrates an example topic-mapping index that associates input topics with broad topics and similarity scores.

FIG. 6 illustrates an example data structure showing broad topics and similarity scores generated by an aggregate broad topic generator.

FIG. 7 illustrates an example data structure showing broad topics and similarity scores generated by a second execution of an aggregate broad topic generator.

DESCRIPTION OF EXAMPLE EMBODIMENTS

System Overview

Figure 1:
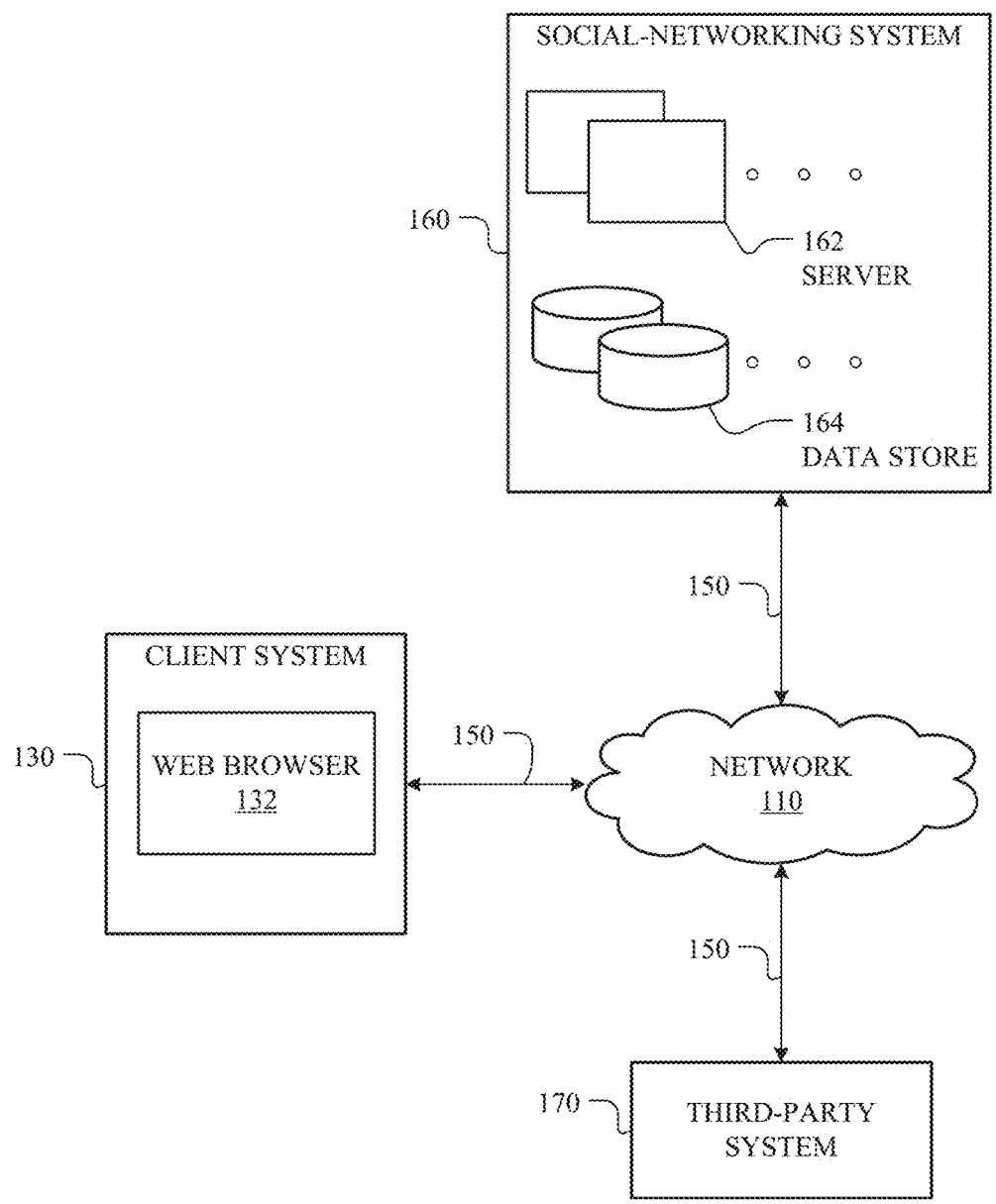
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept) and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
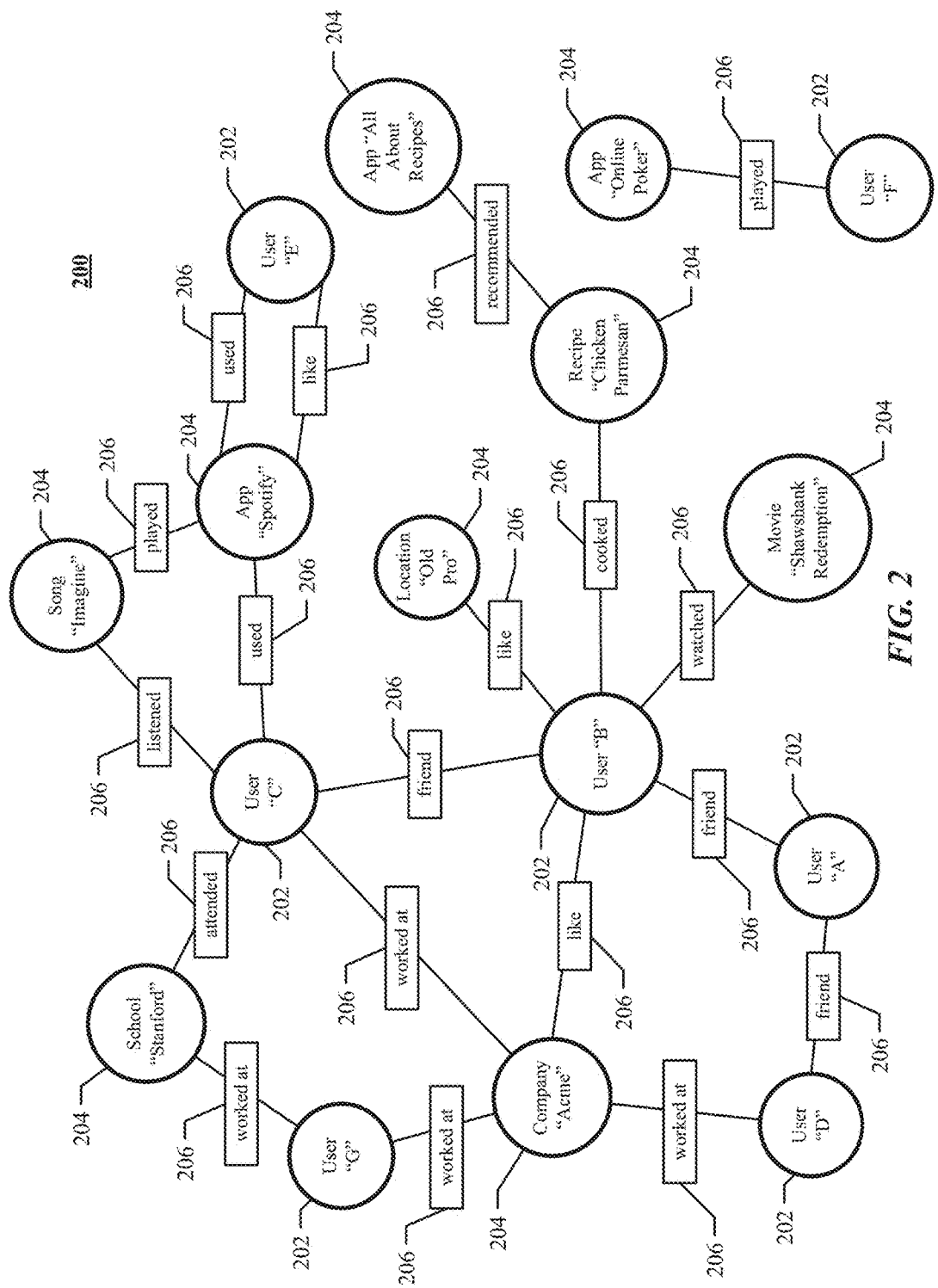
FIG. 2 illustrates an example social graph

FIG. 2 illustrates example social graph 200. In particular embodiments, social-networking system 160 may store one or more social graphs 200 in one or more data stores. In particular embodiments, social graph 200 may include multiple nodeswhich may include multiple user nodes 202 or multiple concept nodes 204 and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system content directed to the user. As an example and not by way of limitation, an advertisement may display information about a friend of the user within social-networking system 160 who has taken an action associated with the subject matter of the advertisement.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Aggregated Broad Topics

Figure 3:
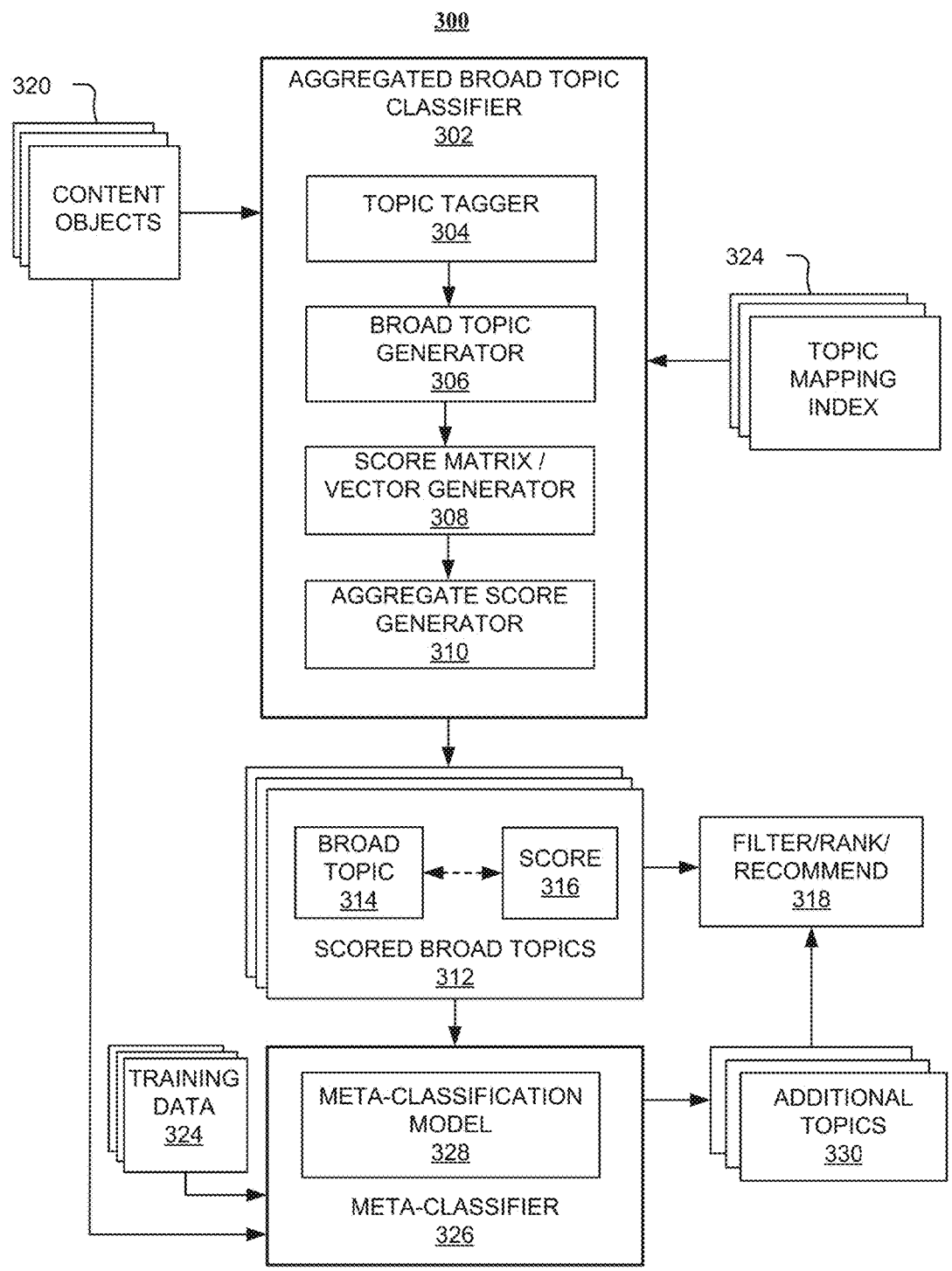
FIG. 3 illustrates an example content classification system.

FIG. 3 illustrates an example content classification system 300, which may be used by a social-networking system 160 to generate scored broad topics 312 of content objects 320. The scored broad topics 312 may be used, for example, to generate recommendations and rankings of the content objects 320. The content classification system 300 may be implemented as computer program code executable on one or more servers 162 of the social-networking system 160, or on other computer systems, such as the client system 130 or the third-party system 170.

In particular embodiments, the content classification system 300 includes an aggregated broad topic classifier 302, which may receive as input one or more content objects 320, and may generate one or more scored broad topics 312 of the content objects. The content objects 320 may include news stories, social-network events, social-network posts or comments, headlines, instant messages, chat room conversations, emails, advertisements, pictures, video, music, other suitable objects from which topics may be extracted, or any combination thereof. In particular embodiments, the term "broad" topic as used herein may refer to a topic that has a broader meaning than at least one of the words in the text content for which the broad topic is generated. For example, a broad topic of a sentence that contains the words "Babe Ruth" and "New York Yankees" may be "baseball." Thus, a broad topic of an item of text content may be the name of a category into which the text content can be classified. A broad topic may be, but is not necessarily, broader than a topic from which the broad topic is generated. The term "broad" when used herein to describe a topic does not necessarily imply that the topic has a broad meaning. The term "scored broad topics" as used herein may refer to broad topics that are associated with scores, e.g., a set of broad topics, each of which is associated with a similarity score indicating a strength of similarity between the broad topic and a topic of the one or more content objects 320. Although this disclosure describes generating and aggregating broad topics and associated scores in a particular manner, this disclosure contemplates generating and aggregating broad topics and associated scores in any suitable manner.

In particular embodiments, the social-networking system 160 may derive a plurality of input topics based on a content item 320. The aggregated broad topic classifier 302 may use a topic tagger 304 to identify the input topics in the content item 320. The input topics may be topics of the content objects 320. The input topics may include entity names, e.g., names of entities in an online social network, and common names, e.g., proper nouns. The input topics may include words or phrases that are present in the content objects 320. For example, for a content object 320 that has the text "Babe Ruth of the New York Yankees," the topic tagger 304 may identify "Babe Ruth" and "New York Yankees" as input topics. The topic tagger 304 may also identify "baseball" as an input topic, although "baseball" is not present in the content object 320, if the topic tagger 304 is capable of identifying topics that are not present in the input but are implied by the input. The term "input topics" is used herein to refer to topics that may be received by a broad topic generator 306, but is not limited to referring to topics received as input.

In particular embodiments, each of the input topics may be associated with a confidence value that indicates a degree of confidence in the input topic, and generating the matrix may include excluding each input topic having a confidence value that does not satisfy a threshold condition. The topic tagger 304 may produce a confidence value along with each input topic that it generates. The aggregated broad topic classifier 302 may use the confidence values as weights, e.g., by multiplying each similarity score by the confidence value associated with the input topic. In particular embodiments, input topics produced by the topic tagger that have low confidence values may be discarded instead of being weighted. That is, only input topics that have a minimum threshold confidence value (e.g., 0.15, 0.2, 0.33, or the like) may be correlated to broad topics to determine similarity scores. In particular embodiments, input topics that are and/or contain common nouns may be discarded. In particular embodiments, scores above a threshold value, e.g., 0.8 or 0.9, may be converted to 1.0. In particular embodiments, normalization of similarity scores may be done per-topic or overall, for all topics. In particular embodiments, the topics may be in a language such as English, Spanish, French, Japanese, and so on.

In particular embodiments, to generate the matrix of scores, the social-networking system 160 may generate a first set of cross-indexed topics from a database of topics, wherein each of the first cross-indexed topics is based on an entry in the database of topics. As an example and not by way of limitation, a broad topic generator 306 may generate a set of identified broad topics based on the given set of input topics using a topic mapping index 324 that maps input topics to broad topics. The cross-indexed topics may correspond to the broad topics. As described above, the broad topics may be, but are not necessarily, broader than the input topics. The topic-mapping index 324 includes mappings that associate each topic in a first set of topics with a corresponding broad topic in a set of broad topics. The sets of input topics and broad topics, and the associations between them, may be provided by a data set such as the Wikipedia™ online encyclopedia. The data set may be used to generate broad topics by searching the first set of topics for each input topic to identify the corresponding broad topic in the set of broad topics. The search may be performed using the topic-mapping index 324, which may provide an index of the data set for efficient lookup of the input topics and retrieval of the corresponding broad topics. As an example and not by way of limitation, the topic-mapping index may be generated based on the data set at an initialization stage prior to a runtime stage in which the aggregated broad topic classifier is used for generating broad topics. In particular embodiments, if the topic mapping-index may be restricted to containing only mappings for which the broad topic is broader than the tagged topic, then the identified broad-topics are broader than the input topics. This restriction is optional, however, and useful results may be produced when the broad topics are not limited to being broader than the input topics.

In particular embodiments, the social-networking system 160 may normalize the total scores for the first cross-indexed topics to a new upper bound by identifying an existing upper bound and scaling the total scores by a value proportional to a ratio of the new upper bound to the existing upper bound. For example, the old upper bound may be 1.75, the new upper bound may be 1.0, and the total scores may be multiplied by the new upper bound divided by the old upper bound.

In particular embodiments, the topic-mapping index 324 may include a similarity score for each association between a first topic and a broad topic. The similarity score may be used to determine a strength or degree of similarity between each input topic and the corresponding broad topic in the topic-mapping index 324. The similarity scores may be pre-calculated, e.g., when the topic-mapping index 324 is constructed, or may be calculated upon being requested by the score matrix/vector aggregator 308, or at other times prior to being requested. In particular embodiments, the similarity scores may be generated based on feedback from human trainers about the similarity between topics or by other techniques, such as analyzing the cross-links between pairs of entities in the social-networking system 160, the page links to the pages of two entities in the online encyclopedia, cosine similarity between text of two entities in the social-networking system 160 or in the data set, or other properties of the Wikipedia™ (or other online encyclopedia) graph.

In particular embodiments, for each input topic derived from the content objects 320 by the topic tagger 304, the input topic, the corresponding broad topic, and the similarity score from the topic-mapping index 324 may be stored in a matrix or vector. A vector may be a row or column of a matrix, so a list of vectors may correspond to a matrix, as described below. FIG. 6, for example, illustrates a matrix in which each column corresponds to a vector for a broad topic.

In particular embodiments, the topic mapping index 324 may include copies of the topic mappings retrieved from the data store, or may contain references to the data store instead of copies, e.g., to reduce memory consumption or access times, or may include a combination of copies and references. Thus, a copy of the topic mappings from the topic-mapping index 324 may be stored in the matrix or vector. Alternatively, a reference to these topic mappings in the topic mapping index 324 (e.g., a row identifier for the input topic) may be stored in the matrix or vector, without making a copy of the topic mappings. Whether a copy of or reference to the topic mappings is made may depend on factors such as the size of the topic mapping index 324, the amount of memory available to store copies, the difference in access times for retrieving the topic mappings from the index 324 and from a memory copy, the number of different content objects for which topic mappings are retrieved or are expected to be retrieved from the topic mapping index 324, and the like. An example topic-mapping index is illustrated in FIG. 5.

In particular embodiments, to identify broad topics, the broad-topic generator 306 may search or otherwise access the topic mapping index 324 for each of the input topics from identified by the topic tagger 304, and retrieve from the topic-mapping index 324 one or more identified broad topics associated with each of the input topics. The broad topics identified in a first execution of the aggregated broad topic classifier for a particular content object 320 may be referred to herein as "first" identified broad topics, since subsequent iterative executions may be performed to produce additional broad topics, as described below.

In particular embodiments, the identified broad topics and associated similarity scores may be represented as a broad-topic vector that includes one or more broad topics for a particular input topic. The identified broad topics and similarity scores may also be represented as a matrix, in which case rows of the matrix may correspond to input topics, and each row may contain the similarity scores of broad topics for an input topic, and each column may represent the input topics for a broad topic. Other data representations are contemplated. For example, the rows may correspond to the broad topics, and the columns may correspond to the input topics, the matrix may be represented as a two-dimension array or a list of lists, and so on. Either the matrix or vector representation, or a combination of both, may be used to represent the similarity scores, as determined by a particular design or implementation of the aggregated broad topic classifier 302.

In particular embodiments, in the vector representation, each of the broad-topic vectors may be a vector of similarity scores that correspond to broad topics and represent the similarity between the input topic that corresponds to the vector and the broad topic that corresponds to the score's position in the vector. Each broad topic vector may be copied to memory, or may be accessed by a reference that represents the vector without making a copy (e.g., as a row identifier and broad topic identifier, which identify a similarity score in the data set), as described above.

In particular embodiments, in the matrix representation, each of the identified input topics may correspond to a row of the matrix, each of the corresponding broad-topics may correspond to a column of the matrix, and a similarity score for each combination of identified input topic and corresponding broad topic may be stored in the matrix entry at the intersection of the row and column that correspond to the similarity score. That is, each of the vectors may be a column (or, alternatively, a row) of the matrix. As described above, the matrix or vectors may include copies of the topics and similarity scores from the data set, or may include references to the topics and similarity scores stored in the data set, or a combination thereof. As an example of a combination of copies and references, copies may of frequently-accessed topic mappings may be stored in the topic-mapping index 324, and references to infrequently-access topic mappings may be stored in the topic-mapping index 324.

In particular embodiments, the social-networking system 160 may generate a matrix of scores for the input topics according to a first set of cross-indexed topics, wherein each of the scores indicates a degree of similarity between a corresponding one of the input topics and a corresponding one of the first cross-indexed topics. Further, the social-networking system 160 may calculate a total score for each of the first cross-indexed topics based on the scores for the first cross-indexed topic across all of the input topics. The first cross-indexed topics may correspond to the retrieved broad topics. As an example and not by way of limitation, an aggregate score generator 310 may calculate an aggregate score vector or matrix entries that represent the sum of the similarity scores of the retrieved broad topic vectors or matrix entries. The aggregate score vector may be represented as a row of the matrix, as shown by the row labeled "sum" in FIG. 6. Alternatively, if broad topics are represented by rows instead of columns, and input topics are represented by columns instead of rows, then the sum vector may be represented by a column of the matrix. As another alternative, the aggregate scores may be stored in a list or other data structure instead of in a vector or row of the matrix. As an example and not by way of limitation, the aggregate score vector may be calculated as the sum of the similarity scores in the retrieved broad-topic vectors. The resulting aggregate score vector contains an aggregate similarity score for each broad topic. The entries in each position in the broad-topic vectors may be similarity scores that correspond to the broad topic associated with the position in the vector, so the broad topics themselves need not be stored in the vectors. For example, a single vector of broad topic names may be maintained and correlated with the score vectors to identify the scores for each broad topic. The broad topics in the aggregate score vector can be sorted by their associated similarity scores to produce a ranked list of broad topics. As an example and not by way of limitation, the broad topics may be aggregated by calculating an aggregate score vector for each input topic identified in the content object 320. Each aggregate score vector may include one or more aggregate similarity scores. Each of the aggregate similarity scores may be a sum of the input topic similarity scores associated with the broad topic (e.g., the sum of the corresponding similarity scores in each of the broad topic vectors). That is, the aggregate scores for each input topic may be represented as a vector of scores that correspond to the broad topics for that input topic. The broad topics may thus include a total similarity score for each broad topic. As described above, although the similarity scores associated with each input topic are described herein in terms of vectors, other representations are contemplated. For example, a matrix, two-dimensional array, or other appropriate type of data representation may be used instead of the set of vectors. The identified broad topic having the highest aggregate score may be considered the best match of the identified broad topics, and may be the most likely of the identified broad topics to be an overarching or overall topic of the content object 320.

In particular embodiments, the identified broad topics generated by the aggregated broad topic classifier 302 may be referred to herein as scored broad topics 312. Each of the scored broad topics 312 may include an identified broad topic 314 and a similarity score 316 associated with the identified broad topic 314.

In particular embodiments, the social-networking system 160 may select one or more of the first cross-indexed topics based on the total scores of the first cross-indexed topics. The scored broad topics 312 may be passed to a filter/rank/recommend component 318, which may filter, rank, and/or select for recommendation one or more of the initial broad topics to generate one or more resulting broad topics to be presented to a user or to be used in identifying content objects 320 to be presented to a user.

In particular embodiments, the social-networking system 160 may exclude from the selected first cross-indexed topics one or more of the first cross-indexed topics having a total score that does not satisfy a predetermined condition. For example, the filter/rank/recommend component 318 may filter the scored broad topics 312 by selecting one or more of the scored broad topics 312 that satisfy a filtering condition to be selected as the resulting broad topics. The filtering condition may be, e.g., that the score is greater than a threshold value, such as 0.2, 0.5, 0.8, 1.0, 1.2, or the like, so that broad topics 313 having scores 316 greater than the threshold value are selected. As another example, the filtering condition may be based on a maximum number N of scores to be identified, and the top N scores may be selected. In particular embodiments, the scores 316 may be normalized, e.g., so that they sum to 1, or so that they all range from 0 to 1. Although this disclosure describes filtering broad topics and corresponding content items in a particular manner, this disclosure contemplates filtering broad topics and corresponding content items in any suitable manner.

In particular embodiments, the social-networking system 160 may rank the first cross-indexed topics, which may be the scored broad topics 312, according to the total scores. As an example and not by way of limitation, the filter/rank/recommend component 318 may rank the scored broad topics 312 in order of similarity to the content object 320 by sorting them according to their associated scores 316. The scored broad topics 312 may be useful for ranking content objects 320 such as posts, or as input to a meta-classifier 320 that processes the output of the aggregate broad topic classifier 302 and/or other classifiers (not shown) to perform tasks such as ranking based on a variety of classifiers. The content objects may be presented to the user in an order based on the aggregate scores associated with the broad topics associated with the content objects.

In particular embodiments, the filter/rank/recommend component 318 or another component of the social-networking system 160 may use the scored broad topics 312 to identify one or more of the content objects 320 to be recommended to a user. As an example and not by way of limitation, each of the scored broad topics 312 may be compared to topics known to be of interest to a user to determine whether to recommend a particular content object 320 that is associated with (e.g., contains) the broad topic to the user, how highly to rank the particular content object 320 in a list of search results presented to the user, or for other purposes. As an example and not by way of limitation, selected ones of the content objects 320 may be recommended to a user if the content object's corresponding broad topic(s) 314 are the same as or similar to topics known to be of interest to the user.

The content classification system 300 may also include a meta-classifier 326, which may classify the content objects 320 into one or more additional topics 330 based on features extracted from the content objects. Each of the scored broad topics 312 generated by the aggregated broad topic classifier 302 may include a broad topic 314 and an aggregate score 316, and may be used as a feature by the meta-classifier 326. The meta-classifier 326 may use information such as feature data from other classifiers (not shown) and combine the information from multiple classifiers to generate the additional topics 330 of the content objects 320. The meta-classifier 326 may use a logical regression technique based on a meta-classification model 328 trained using training data 324. The additional topics 330 generated by the meta-classifier 326 may be passed to the filter/rank/recommend component 318 to filter, rank, and/or recommend the content objects 320 to the user, as described above.

In particular embodiments, the social-networking system 160 may repeat the generating using the first set of cross-indexed topics as the input topics to generate a second set of cross-indexed topics, wherein each of the scores indicates a degree of similarity between a corresponding one of the first set of cross-indexed topics and a corresponding one of the second cross-indexed topics. In particular embodiments, the social-networking system 160 may generate a matrix of scores for the first set of cross-indexed topics according to a second set of cross-indexed topics, wherein each of the scores indicates a degree of similarity between a corresponding one of the first cross-indexed topics and a corresponding one of the second cross-indexed topics. For example, the aggregated broad topic classifier 302 may be invoked a second time using the broad topics 312 as input topics in addition to or in place of input topics identified by the topic tagger 304, and the invocation may be repeated to execute the aggregated broad topic classifier 302 a number of times until a threshold condition is reached. The threshold condition may be, for example, an upper limit on the number of times the broad topic classifier 302 is executed. As another example, the threshold condition may be based on how many new (e.g., not generated in a previous iteration) broad topics are generated by each iterative execution of the broad topic classifier 302. If less than a threshold number of new topics are generated, for example, then the threshold condition may be satisfied, and the iteration may be stopped for the particular input content objects 320. The threshold number of new topics may be, e.g., 1, 5, 10, or other appropriate value. As still another example, the threshold condition may be based on an amount or percentage by which scores for particular broad topics change. If the scores of all or a threshold number of broad topics generated by an iteration change by less than a threshold percentage from the previous iteration, then the iterative execution may be stopped. The threshold percentage may be, e.g., 5%, 10%, 20%, or other appropriate value. Repeated iterative executions of the aggregated broad topic classifier 302 are described further with reference to FIG. 10.

FIG. 4 illustrates an example table 400 showing two broad topics with aggregated similarity scores. The columns labeled New York Yankees and Hot Dogs in the table 400 correspond to input topics, which may have been extracted from text content such as "I ate two Hot Dogs at the New York Yankees game." The rows labeled Baseball and Sports in the table 400 correspond to broad topics that have been identified for the input topics. Baseball is a broad topic for the input topic New York Yankees with a similarity score of 0.9 (indicating a high degree of similarity). Baseball is also a broad topic for the input topic Hot Dogs with a similarity score of 0.25 (indicating a lower degree of similarity than for New York Yankees). The aggregate score for the broad topic Baseball is 0.9+0.25, which is 1.15. Sports is also a broad topic for the input topic New York Yankees and has a similarity score of 0.6 (indicating a medium degree of similarity). Sports is also a broad topic for the input topic Hot Dogs with a similarity score of 0.25 (indicating a lower degree of similarity than for New York Yankees). The aggregate score for the broad topic Sports is 0.6+0.25, which is 0.85. Since the aggregated score for the broad topic Baseball is greater than the aggregate score for the broad topic Sports, Baseball or content associated with Baseball may be ranked higher than Sports or content associated with Sports when determining topics or content to recommend to a user, when determining a ranking order for topics or content to recommend to a user, or otherwise performing a comparison that involves the topics Baseball and Sports.

In particular embodiments, the scores shown in FIG. 4 may be represented as vectors. For example, each broad topic may be associated with a vector of similarity scores for the input topics that produced the broad topic. Thus, the Baseball broad topic in this example is associated with the vector [0.9, 0.25]. The positions of the entries in the vector correspond to the positions of the input topics, so 0.9 is the similarity score for New York Yankees and 0.25 is the similarity score for the input topic Hot Dogs. The sum, e.g., 1.15, is not necessarily part of the vector, and may be determined by calculating the sum of the vector's components. Further, the Sports broad topic in this example is associated with the vector [0.6, 0.25]. Note that the vectors are shown horizontally in FIG. 4, but may also be shown vertically, with the columns corresponding to broad topics and the rows corresponding to input topics.

FIG. 5 illustrates an example topic-mapping index 500 that associates input topics with broad topics and similarity scores. The social-networking system 160 may generate the topic-mapping index 500 from a topic mapping data set such as an online dictionary, online encyclopedia, or other entity database. The data set may include a set of input topics and a set of mappings from the input topics to broad topics. As an example and not by way of limitation, the data set may be Wikipedia™, the input topics may be Wikipedia pages and/or social network entities, and the mappings may be based on the associations between the Wikipedia pages and Wikipedia categories. The broad topics may correspond to the Wikipedia categories in this example. The topic mapping index 500 may be generated from Wikipedia entries by, for each input topic, retrieving the Wikipedia article page for the input topic, retrieving one or more categories from the article page, and using the one or more categories as the broad topics for the input topic. Similarity scores may be calculated between the input topic and each of the categories, and the similarity scores may be stored in the topic-mapping index in association with the input topic and broad topic(s). Optionally, a super-category of the retrieved category may be retrieved from Wikipedia and used as a broad topic of the input topic. For example, given an input topic Baseball, the Wikipedia article's category is a category named Baseball. Thus, the broad topic may be Baseball. Broad topic names that are the same as input topic names may be discarded, and the next higher category may be used as a broad topic instead. For example, the Baseball itself may have a super-category Team Sports, so Team Sports may be used as a broad topic of Baseball.

In particular embodiments, for each broad topic, e.g., for each social-network entity in the social-networking system 160 and/or each Wikipedia category in which one of the input topics is categorized, the topic mapping index 500 may contain a vector of similarity scores. Each similarity score in a vector may indicate a strength of similarity between the broad topic that corresponds to the vector and an input topic that corresponds to the position of the similarity score in the vector. The strength of similarity may be represented as a floating-point number, integer number, or other type of value. Each vector may be a column of the topic-mapping index 500.

The table 500 shows example similarity score vectors, which correspond to the broad topics, as vertical vectors. For each broad topic in the data set, e.g., a Wikipedia category, and/or for each entity in the online social network, the topic-mapping index 324 may contain a vector of pre-calculated similarity scores. Alternatively, the similarity scores may be calculated by the aggregated broad-topic classifier 302 for each (input topic, broad topic) combination identified by the broad-topic generator 306. The similarity scores may be calculated using a similarity formula or algorithm on each of the identified input topics and broad topics, such as cosine similarity, or the like. The calculated similarity scores may be cached in memory, e.g., in association with the corresponding broad topic, to avoid re-calculation.

The example index 500 includes nine broad topics, each of which is associated with a vector of eight similarity scores that correspond to the eight input topics. The input topics are Baseball, Yankees, Hot Dogs, Sports, JFK, Football, Ball, and Zebra. The broad topics are Baseball, Sports, JFK, Football, Ball, Zebra, Competition, President, and Animal. Each input topic is cross-referenced with a broad topic and the entry in the index 500 at which the input topic's row intersects the broad topic's column. Accordingly, the intersected broad topic may be referred to as a cross-indexed topic. The topic-mapping index may be used to identify broad topics that correspond to a given input topic. For example, for the input topic Baseball, the broad topics are Baseball with a similarity score of 1.0 (indicating very strong similarity), Sports with a score of 0.8, JFK with a score of 1.0, Football with a score of 0.3, Zebra with a score of 0.01, and Competition, President, and Animal with scores of 0 (indicating no or very weak similarity). The topic-mapping index 500 may also be used to identify input topics that correspond to a given broad topic. For example, for the broad topic Sports, the input topics are Baseball with a score of 0.8, Yankees with a score of 0.6, Hot Dogs with a score of 0.25, Sports with a score of 1.0, JFK with a score of 0.02, Football with a score of 0.1, Ball with a score of 0.7, and Zebra with a score of 0.01. The broad topics for a set of input topics extracted from text content can thus be retrieved from the topic-mapping index 500 by retrieving the input topic row for each input topic.

The topic-mapping index 500, or a portion thereof, may be stored in a memory 1104 of a computer system 1100. For example, vectors for frequently-used broad topics may be stored or cached in the memory 1104, and vectors for other topics may be stored in storage 1106. As another example, rows for frequently-used input topics may be cached in the memory 1104. Although the mapping index 500 is described as having vectors, other representations are possible. For example, the mapping index 500 may be represented as a matrix in which the rows correspond to input topics and the columns correspond to broad topics. As another alternative, the rows may correspond to broad topics and the columns may correspond to input topics. Other representations that associate each input topic with a set of broad topics and a score that represents the similarity between the corresponding input topic and broad topic are contemplated.

FIG. 6 illustrates an example data structure that includes broad topics and similarity scores generated by an aggregate broad topic generator. The columns labeled New York Yankees and Hot Dogs in the table 600 correspond to input topics, which may have been extracted from text content such as "I ate two Hot Dogs at the New York Yankees Baseball game." The rows labeled Baseball, Sports, JFK, Football, Ball, and Zebra in the table 600 correspond to broad topics that have been identified for the input topics, e.g., by retrieving the broad topics from the topic mapping index 500 as described with reference to FIG. 5.

In particular embodiments, the aggregate broad topic scores shown in the Sum row in FIG. 6 may be determined for each column by adding together the scores in the column. For example, Baseball is a broad topic for the following input topics: Baseball, with a similarity score of 1.0, New York Yankees, with a score of 0.9, and Hot Dogs, with a score of 0.25. The aggregate score for the broad topic Baseball is the sum of those scores, which is 2.15. Adding the similarity scores for each of the other broad topics in FIG. 6 results in the following aggregate broad topic scores: Sports=1.65, JFK=0.31, Football=0.5, Ball=0.31, and Zebra=0.085. As an example, if six news articles are to be recommended to a user, each with one of the broad topics shown in FIG. 6, then the articles may be recommended in the following order, sorted by score: Baseball, Sports, Ball, Football, and Zebra. As another example, a threshold value may be used to select articles to be recommended. If the threshold value is 1.0, then the articles having scores of 1.0 or higher, which are Baseball and Sports, may be recommended.

In particular embodiments, the scores shown in FIG. 6 may be represented as vectors. For example, each broad topic may be associated with a vector of similarity scores for the input topics that produced the broad topic. Thus, the "Sports" broad topic in this example is associated with the vector [0.8, 0.6, and 0.25]. The positions of the entries in the vector correspond to the positions of the input topics, so 0.8 is the similarity score for Baseball, 0.6 for Yankees, and 0.25 for Hot Dogs. Note that although the similarity scores for each broad topic are represented by column vectors in FIG. 6, the scores may also be represented by row vectors, or in any other format in which scores associated with input topics and broad topics can be stored and retrieved from memory.

FIG. 7 illustrates an example data structure that includes broad topics and similarity scores generated by a second iterative execution of an aggregate broad topic generator. In particular embodiments, the method of generating aggregate broad topics may be iteratively or recursively repeated using the broad topics as the input topics to generate additional broad topics. The method may be repeated any number of times in this way, although a small number of repetitions, e.g., 1, 3, 4, or the like, may be sufficient to identify a majority of the broad topics that are identified with larger numbers of repetitions. As an example and not by way of limitation, FIG. 7 shows the broad topics generated in FIG. 6, Baseball, Sports, JFK, Football, Ball, and Zebra, being used as a second set of input topics. The broad topics generated for the second set of input topics form a second set of broad topics. To identify the second set of broad topics, the topic-mapping index 500 may be searched for each of the second set of input topics. The similarity scores may be retrieved from the broad topic index 500, or may be calculated when the data structure 700 is constructed if the similarity scores are not stored in the broad topic index 500. For example, a broad topic for the input topic Sports is Competition with a similarity score of 0.7 according to the broad topic index 500. An entry is thus made in the data structure 700 with a second broad topic of Competition for the second input topic Sports, and the cross-referenced similarity score is set to 0.7. The second set of broad topics includes the broad topics associated with each of the second set of input topics in the broad topic index 500. Similarly, the broad topic President is identified for the input topic JFK, and the broad topic Animal is identified for the input topic Zebra. Thus, the second set of broad topics in FIG. 7 includes Baseball, Sports, JFK, Football, Ball, Zebra, Competition, President, and Animal.

In particular embodiments, the aggregate broad topic scores shown in the Sum row in FIG. 7 may be determined for each column by adding together the scores in the column. For example, President is a broad topic for the following input topics: Sports, JFK, Football, Ball, and Zebra. The aggregate score for the broad topic President is the sum of the scores in the President column, which is 0.918. Adding the similarity scores for each of the other broad topics in FIG. 6 results in the following aggregate broad topic scores: Baseball=1.07, Sports=2.63, JFK=1.51, Football=2.32, Ball=2.21, Zebra=1.05, Competition=0.91, President=0.918, and Animal=1.402. As an example, if three news articles are to be recommended to a user, each with one of the broad topics shown in FIG. 6, then the articles may be recommended in the following order, sorted by score: Sports, Football, and Ball. As another example, if a threshold value of 1.0 is used to select articles to be recommended, then the articles having scores below 1.0, which are Competition and President, may be excluded from recommendation.

Figure 8:
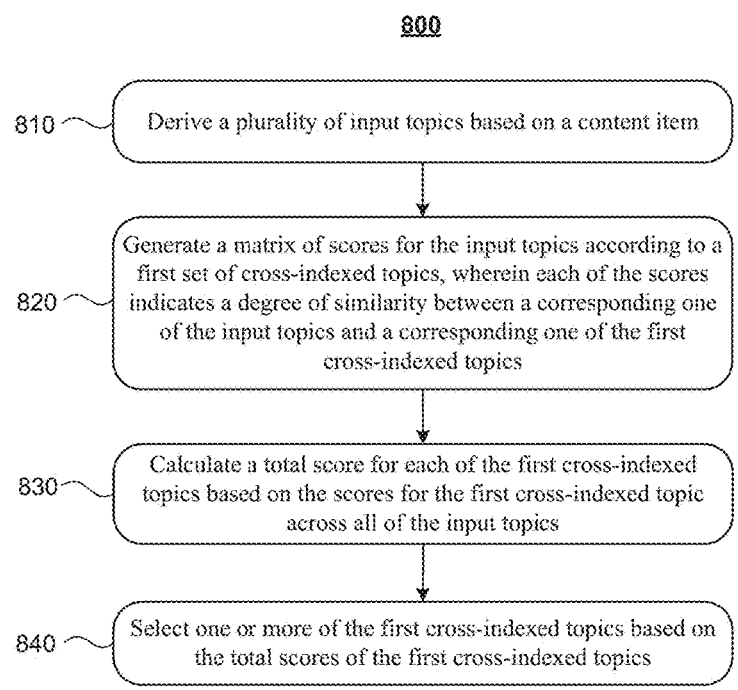
FIG. 8 illustrates an example method for generating aggregated broad topics.

FIG. 8 illustrates an example method 800 for generating aggregated broad topics. The method 800 may begin at step 810, where the social-networking system 160 may derive a plurality of input topics based on a content item. In particular embodiments, the content item may be a content object 320, which may include text content. A topic tagger 304 may be used to identify input topics in the text content. The input topics may include entity names, e.g., names of entities in an online social network, and common names, e.g., proper nouns, that are present in the content objects 320. At step 820, the social-networking system 160 may generate a matrix of scores for the input topics according to a first set of cross-indexed topics, wherein each of the scores indicates a degree of similarity between a corresponding one of the input topics and a corresponding one of the first cross-indexed topics. In particular embodiments, the matrix of scores may be generated by identifying broad topics for each of the input topics using a topic-mapping index 324. For example, the topic-mapping index 500 of FIG. 5 may be used to identify broad topics for each input topic. The broad topics may be used as the cross-indexed topics. The scores may include a similarity score for each distinct (input topic, cross-indexed topic) combination, as shown in FIGS. 6 and 7. The scores need not be computed until requested or referenced, or a subset of the scores may be pre-computed. Each similarity score may be based on a degree of similarity between the input topic and the corresponding cross-indexed topic. The matrix may include a set of vectors, which may be either rows or columns of the matrix. Each vector may include similarity scores for one or more input topics associated with a broad topic, as shown in FIGS. 6 and 7. At step 830, the social-networking system 160 may calculate a total score for each of the first cross-indexed topics based on the scores for the first cross-indexed topic across all of the input topics. Each of the total similarity scores may be a sum of the input topic similarity scores associated with the cross-indexed topic (e.g., the input topic, with the sum being a sum of the corresponding similarity scores in each of the broad topic vectors). That is, the aggregate scores for each input topic may be represented as a vector of scores that correspond to the broad topics for that input topic. At step 840, the social-networking system 160 may select one or more of the first cross-indexed topics based on the total scores of the first cross-indexed topics. For example, the filter/rank/recommend component 316 may be used to select one or more of the cross-indexed topics and rank or filter the cross-referenced topics or articles that are related to the cross-referenced topics, e.g., as described above with reference to FIGS. 6 and 7.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating aggregated broad topics including the particular steps of the method of FIG. 8, this disclosure contemplates any suitable method for generating aggregated broad topics including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
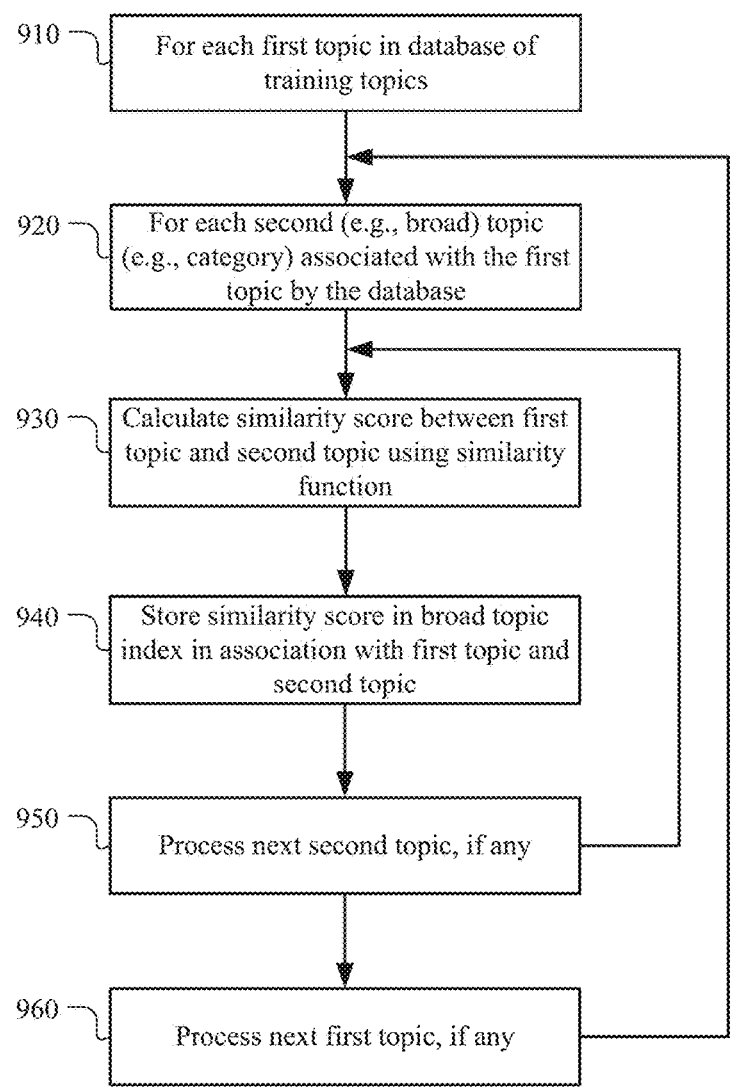
FIG. 9 illustrates an example method for generating a data structure that associates input topics with broad topics and similarity scores.

FIG. 9 illustrates an example method 900 for generating a topic-mapping index that associates input topics with broad topics and similarity scores. The method 900 may generate a topic-mapping index such as the example topic-mapping index 500 of FIG. 5. The method 900 may begin at step 910, where the social-networking system 160 may prepare to execute subsequent steps, e.g., steps 920-960, for each first topic in a database of training topics such as Wikipedia or the like. At step 920, the social-networking system 160 may prepare to execute subsequent steps, e.g., steps 930-950, for each second (e.g., broad) topic associated with the first topic by the topic mapping index 500. At step 930, the social-networking system 160 may calculate a similarity score between the first topic and second topic using a similarity function such as cosine similarity or the like. At step 940, the social-networking system 160 may store the calculated similarity score in the broad topic index in association with first and second topics. At step 950, the social-networking system 160 may transfer control to step 930 to repeat steps 930 and 940 for the next second topic, if there is another second topic. Otherwise, if there is not another second topic, step 960 is executed. At step 960, the social-networking system 160 may transfer control to step 920 to repeat steps 920-950 for the next first topic, if there is another first topic.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for generating a topic-mapping index including the particular steps of the method of FIG. 9, this disclosure contemplates any suitable method for generating a topic-mapping index including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 10:
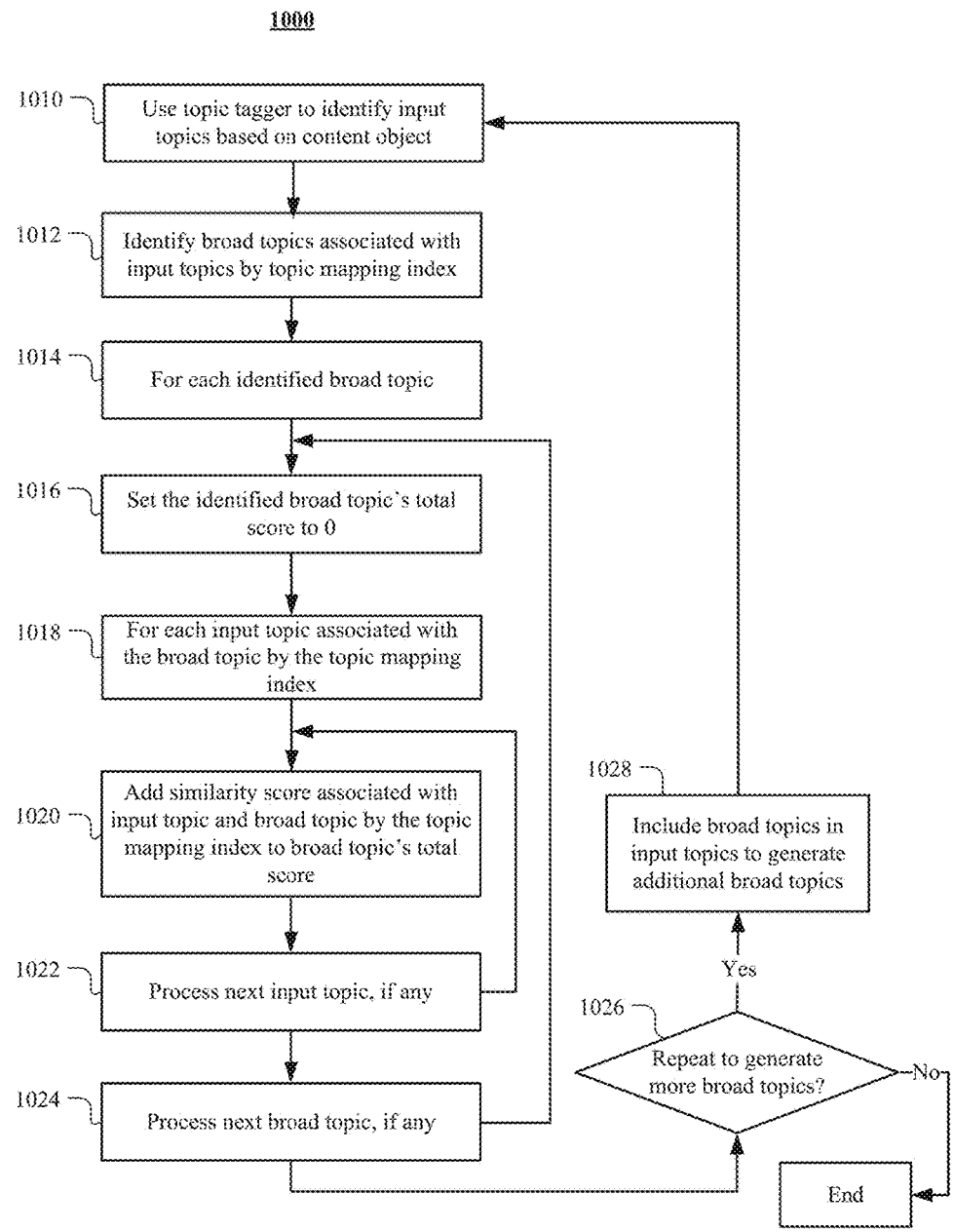
FIG. 10 illustrates an example method for identifying broad topics and aggregating similarity scores.

FIG. 10 illustrates an example method 1000 for identifying broad topics and aggregating similarity scores. In particular embodiments, the social-networking system 160 may repeat the broad-topic generating method, such as the method 800 of FIG. 8, using the first set of cross-indexed topics as the input topics to generate a second set of cross-indexed topics, where each of the scores indicates a degree of similarity between a corresponding one of the first set of cross-indexed topics and a corresponding one of the second cross-indexed topics. In particular embodiments, the social-networking system 160 may generate a matrix of scores for the first set of cross-indexed topics according to a second set of cross-indexed topics, where each of the scores indicates a degree of similarity between a corresponding one of the first cross-indexed topics and a corresponding one of the second cross-indexed topics. The method 1000 may begin at step 1010, where the social-networking system 160 may use topic a tagger to identify input topics based on content object. At step 1012, the social-networking system 160 may identify broad topics associated with input topics by a topic-mapping index 324. At step 1014, the social-networking system 160 may prepare to execute subsequent steps 1016-1024 for each identified broad topic.

In particular embodiments, the social-networking system 160 may calculate a total score for each of the second cross-indexed topics based on the scores for the second cross-indexed topic across all of the first cross-indexed topics. At step 1016, the social-networking system 160 may set a total score associated with the identified broad topic to 0. At step 1018, the social-networking system 160 may prepare to execute subsequent steps 1020-1022 for each input topic associated with the broad topic by the topic-mapping index. The topic-mapping index may be, for example, the topic-mapping index 500 of FIG. 5. At step 1020, the social-networking system 160 may add a similarity score associated with the input topic and with the broad topic by the topic-mapping index to the total score associated with the broad topic. At step 1022, the social-networking system 160 may transfer control to block 1020 to process the next input topic, if there is another input topic to process. At step 1024, the social-networking system 160 may transfer control to block 1016 to process the next broad topic, if there is another broad topic to process. If there are no additional topics to process, then at step 1026 the social-networking system may determine whether to iteratively repeat the method 1000 with different input to generate additional broad topics. The determination at step 1026 may be based on, for example, a configuration option specified by a system administrator, and/or a comparison of the number of times that the method 1000 has been executed to an upper limit threshold, such as 1, 2, 4, 5, or the like, or other threshold condition such as those described above with reference to FIG. 3. If step 1026 determines that the method 1000 is to be iteratively repeated, the social-networking system 160 may add the identified broad topics to a set of stored broad topics, replace the input topics with the set of stored broad topics at step 1028 (or add the identified broad topics to the set of input topics), execute the method 1000 again starting at step 1010, and add any additional broad topics generated by the most recent iteration to the set of stored broad topics. In particular embodiments, the scores generated by each successive iteration of the method 1000 may be decayed, e.g., exponentially. For example, the score(s) generated in each iteration of the method 1000 may be reduced by a quantity that increases exponentially with each repeated run. The social-networking system 160 may select one or more of the second cross-indexed topics based on the total scores of the second cross-indexed topics. For example, the second cross-indexed topics may correspond to the scored broad topics 312 generated by a repeated execution of the aggregated broad topic classifier 302. The filter/rank/recommend component 318 may be used as described with reference to FIG. 3 to filter, rank, and/or recommend the scored broad topics 312. If step 1026 determines that the method 1000 is not to be repeated, then the method 1000 ends.

Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for identifying broad topics including the particular steps of the method of FIG. 10, this disclosure contemplates any suitable method for identifying broad topics including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Systems and Methods

Figure 11:
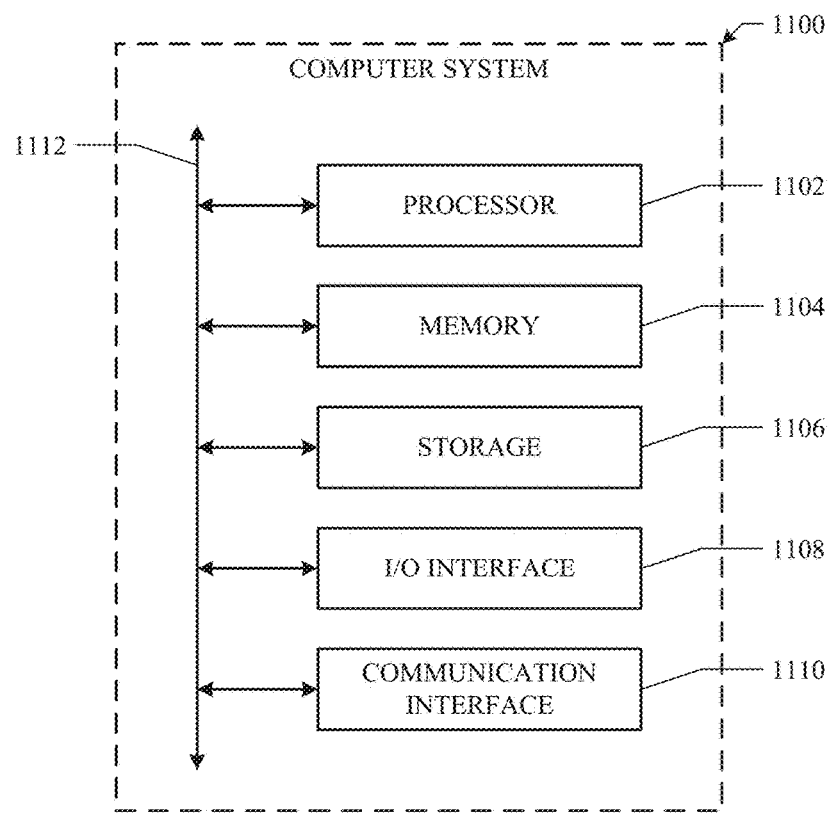
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computing device, deriving a plurality of input topics based on a content item;
   by the computing device, generating a matrix of scores for the input topics according to a first set of cross-indexed topics, wherein each of the scores indicates a degree of similarity between a corresponding one of the input topics and a corresponding one of the first cross-indexed topics;
   by the computing device, calculating a total score for each of the cross-indexed topics of the first set based on the scores for the respective cross-indexed topic of the first set across all of the input topics;
   by the computing device, selecting one or more of the cross-indexed topics of the first set based on the total scores of the cross-indexed topics of the first set;
   wherein generating the matrix of scores comprises generating the first set of cross-indexed topics from a database of topics, wherein each of the first cross-indexed topics is based on an entry in the database of topics; and
   wherein the corresponding one of the first cross-indexed topics of the first set comprises a broad topic associated with the corresponding one of the input topics by the database of topics.

2. The method of claim 1, wherein deriving the plurality of input topics comprises using a topic tagger to identify the plurality of input topics based on the content item.

3. The method of claim 1, wherein each of the input topics is associated with a confidence value that indicates a degree of confidence in the input topic, and generating the matrix comprises excluding each input topic having a confidence value that does not satisfy a threshold condition.

4. The method of claim 1, wherein the total score for each of the cross-indexed topics of the first set is calculated based on a sum of the scores for the respective cross-indexed topic of the first set across all of the input topics.

5. The method of claim 1, further comprising excluding from the selected cross-indexed topics of the first set one or more of the cross-indexed topics of the first set having a total score that does not satisfy a predetermined condition.

6. The method of claim 1, further comprising ranking the cross-indexed topics of the first set according to the total scores.

7. The method of claim 1, further comprising normalizing the total scores for the cross-indexed topics of the first set to a first upper bound by identifying a second upper bound and scaling the total scores by a value proportional to a ratio of the first upper bound to the second upper bound.

8. The method of claim 1, further comprising repeating the generating using the first set of cross-indexed topics as the input topics to generate a second set of cross-indexed topics, wherein each of the scores indicates a degree of similarity between a corresponding one of the first set of cross-indexed topics and a corresponding one of the second cross-indexed topics.

9. The method of claim 1, further comprising:
by the computing device, generating a matrix of scores for the first set of cross-indexed topics according to a second set of cross-indexed topics, wherein each of the scores indicates a degree of similarity between a corresponding cross-indexed topic of the first set of cross-indexed topics and a corresponding cross-indexed topic of the second set of cross-indexed topics;
by the computing device, calculating a total score for each cross-indexed topics of the second set based on the scores for the respective cross-indexed topic of the second set across all of the first cross-indexed topics; and
by the computing device, selecting one or more of the cross-indexed topics of the second set based on the total scores of the cross-indexed topics of the second set.

10. The method of claim 1, further comprising:
by the computing device, providing one or more of the cross-indexed topics of the first set and associated total scores to a meta-tagger.

11. One or more computer-readable non-transitory storage media embodying software that is operable when executed to:
derive a plurality of input topics based on a content item;
generate a matrix of scores for the input topics according to a first set of cross-indexed topics, wherein each of the scores indicates a degree of similarity between a corresponding one of the input topics and a corresponding one of the cross-indexed topics of the first set;
calculate a total score for each of the cross-indexed topics of the first set based on the scores for the respective cross-indexed topic of the first set across all of the input topics;
select one or more of the cross-indexed topics of the first set based on the total scores of the cross-indexed topics of the first set;
wherein the software is further operable when executed to generate the matrix of scores by generating the first set of cross-indexed topics from a database of topics, wherein each of the cross-indexed topics of the first set is based on an entry in the database of topics; and
wherein the corresponding one of the cross-indexed topics of the first set comprises a broad topic associated with the corresponding one of the input topics by the database of topics.

12. The media of claim 11, wherein the software is further operable when executed to derive the plurality of input topics by using a topic tagger to identify the plurality of input topics based on the content item.

13. A system comprising: one or more processors; and a memory coupled to the processors comprising instructions executable by the processors, the processors being operable when executing the instructions to:
derive a plurality of input topics based on a content item;
generate a matrix of scores for the input topics according to a first set of cross-indexed topics, wherein each of the scores indicates a degree of similarity between a corresponding one of the input topics and a corresponding one of the cross-indexed topics of the first set;
calculate a total score for each of the cross-indexed topics of the first set based on the scores for the respective cross-indexed topic of the first set across all of the input topics;
select one or more of the cross-indexed topics of the first set based on the total scores of the cross-indexed topics of the first set;
wherein the processors are further operable when executing the instructions to generate the matrix of scores by generating the first set of cross-indexed topics from a database of topics, wherein each of the cross-indexed topics of the first set is based on an entry in the database of topics; and
wherein the corresponding one of the cross-indexed topics of the first set comprises a broad topic associated with the corresponding one of the input topics by the database of topics.

14. The system of claim 13, wherein the processors are further operable when executing the instructions to derive the plurality of input topics by using a topic tagger to identify the plurality of input topics based on the content item.

* * * * *